US008423566B2

(12) United States Patent
Asai (10) Patent No.: US 8,423,566 B2
(45) Date of Patent: Apr. 16, 2013

(54) FACILITY RETRIEVAL DEVICE (75) Inventor: Masafumi Asai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/120,924

(22) PCT Filed: Nov. 12, 2009

(86) PCT No.: PCT/JP2009/006048
§ 371 (c)(1),
(2), (4) Date: Mar. 25, 2011

(87) PCT Pub. No.: WO2010/061545
PCT Pub. Date: Mar. 6, 2010

(65) Prior Publication Data
US 2011/0179079 A1 Jul. 21, 2011

(30) Foreign Application Priority Data

Nov. 26, 2008 (JP) ................................. 2008-301057

(51) Int. Cl.
*G06F 7/00* (2006.01)
*G06F 17/30* (2006.01)
(52) U.S. Cl.
USPC .......................................... 707/758; 707/770
(58) Field of Classification Search ........................ None
See application file for complete search history.

(56) References Cited

U.S. PATENT DOCUMENTS

| 7,783,419 | B2 | 8/2010 | Taniguchi et al. | |
|---|---|---|---|---|
| 2002/0029226 | A1* | 3/2002 | Li et al. | 707/104.1 |
| 2008/0091657 | A1* | 4/2008 | Yamazaki | 707/3 |

FOREIGN PATENT DOCUMENTS

| JP | 2000-74686 A | 3/2000 |
|---|---|---|
| JP | 2005-55261 A | 3/2005 |
| JP | 2005-149073 A | 6/2005 |
| JP | 2005-190334 A | 7/2005 |
| JP | 2006-24196 A | 1/2006 |
| JP | 2006-133023 A | 5/2006 |
| JP | 2006-145330 A | 6/2006 |
| JP | 2007-310734 | 11/2007 |
| JP | 2008-82733 A | 4/2008 |
| JP | 2008-204109 A | 9/2008 |
| JP | 2008-250565 A | 10/2008 |

OTHER PUBLICATIONS

Roussopoulos et al., "Nearest Neighbor Queries", Proc. ACM SIGMOND pp. 91-79 (1995). DOI: 10.1145/223784.223794.

* cited by examiner

*Primary Examiner* — Jay Morrison
(74) *Attorney, Agent, or Firm* — Birch, Stewart, Kolasch & Birch, LLP (57) ABSTRACT

A facility retrieval device includes: an input device 4 for inputting instructions; a map information storage device 5 that stores map information and facility information including facility names and facility types; a facility name extraction unit 11 that extracts a facility name in response to an instruction from the input device; a facility retrieval unit 12 that uses the facility name extracted by the extraction unit as a retrieval key to retrieve facilities having names that include the retrieval key from the facility information stored in the storage device; a list generation unit 13 that generates a list listing names of a plurality of facilities having identical names and identical types to the facility extracted by the extraction unit, from among the facilities retrieved by the retrieval unit, on respective single lines as shared facility names; and a display device 8 that displays the list generated by the generation unit.

6 Claims, 5 Drawing Sheets

FIG.6

FACILITY RETRIEVAL DEVICE

TECHNICAL FIELD

The present invention relates to a facility retrieval device for retrieving a facility, and more particularly to a technique for displaying retrieval results when a large number of facilities are retrieved.

BACKGROUND ART

A facility retrieval device installed in a navigation apparatus or the like, for example, is conventionally known. When a user inputs the name of a desired facility into the facility retrieval device, a database of facility information stored in a map information storage device is retrieved (this retrieval operation will be referred to hereafter as a "facility name retrieval operation").

When the name of the facility that the user wishes to find in the facility name retrieval operation is a unique name such that only one or a few facilities having the name exist in an entire country, the number of items displayed on a list of retrieval results is small, and therefore the user can select the desired facility from the retrieval result list easily. However, when the name of the facility that the user wishes to find belongs to a large number of identically named facilities over the entire country, for example when the facility is a chain store such as a fast food store or a convenience store, a large number of facilities having the identical name are retrieved over the entire country (an entire region of a map information database recording range) if the name alone is input, and as a result, identically named facilities are displayed over a plurality of pages on the retrieval result list, making it difficult for the user to find the desired facility.

Further, when retrieving a different facility that has the identical name as a large number of identically named facilities, for example a bank or the like having the identical name as a chain store, the facility that the user wishes to find becomes buried in the retrieval result list among the large number of chain stores, and therefore, similarly to the case described above, the user cannot easily find the desired facility.

In order to solve these problems, a retrieval range is narrowed at the start of the facility name retrieval operation or during the retrieval operation with the aim of reducing the number of items displayed on the retrieval result list at the start of the facility name retrieval operation or during the retrieval operation. This narrowing operation is performed during the facility name retrieval process by having the user input a location of the facility.

As a technique relating to facility retrieval, Patent Document 1 discloses a navigation apparatus capable of retrieving facilities of an identical business type to a facility displayed on a map. This navigation apparatus includes: reading means for reading map information and facility information from an HDD; displaying means for displaying information corresponding to the read map information and facility information on a display device; specifying means for specifying corresponding facility information when displayed predetermined information is indicated; extracting means for extracting information indicating a business type from the facility information specified by the specifying means; retrieving means for retrieving another facility belonging to the same business type by referring to the extracted information indicating the business type; and presenting means for presenting another facility obtained through retrieval.

PRIOR ART DOCUMENTS

Patent Documents

Patent Document 1: Japanese Patent Application Publication No. 2006-145330

SUMMARY OF THE INVENTION

However, in the conventional facility retrieval device described above, an operation must be performed to input the location of the facility and also the user must know the location of the desired facility to be inferior in user-friendliness.

The present invention has been designed to solve this problem, and an object thereof is to provide a highly user-friendly facility retrieval device such that a desired facility can be retrieved easily.

In order to achieve this object, a facility retrieval device according to the present invention includes: an input device for inputting an instruction; a map information storage device that stores map information and facility information including a facility name and a facility type; a facility name extraction unit that extracts a facility name in response to an instruction from the input device; a facility retrieval unit that uses the facility name extracted by the facility name extraction unit as a retrieval key to retrieve facilities having names that include the retrieval key from the facility information stored in the map information storage device; a list generation unit that generates a list listing names of a plurality of facilities having an identical name and an identical type to the facility extracted by the facility name extraction unit, from among the facilities retrieved by the facility retrieval unit, on respective single lines as shared facility names; a display device that displays the list generated by the list generation unit; a position calculation unit that calculates a reference position serving as a center of a peripheral facility retrieval operation; and a peripheral facility retrieval unit that, when a shared facility name is selected from the list displayed on the display device in response to an instruction input from the input device retrieves facilities indicated by the shared facility name and existing on a periphery of the reference position calculated by the position calculation unit, wherein the list generation unit generates a list listing names of the facilities retrieved by the peripheral facility retrieval unit.

According to the facility retrieval device of the present invention, a list listing the names of a plurality of facilities having an identical name and an identical type to the facility extracted by the facility name extraction unit, from among the facilities retrieved by the facility retrieval unit, on respective single lines as shared facility names is generated and displayed, and therefore large increases in the number of facilities displayed on the list can be suppressed. As a result, the readability of the list can be improved, making it easier for a user to find a desired facility.

BEST MODE FOR CARRYING OUT THE INVENTION

Embodiments of the present invention will be described in detail below with reference to the drawings.

Embodiment 1

Figure 1:
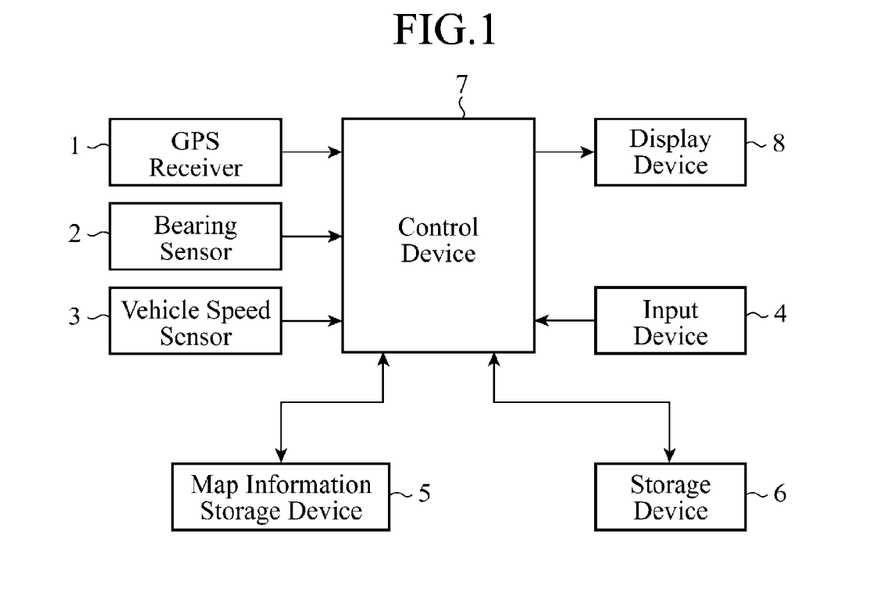
FIG. 1 is a block diagram showing the constitution of a facility retrieval device according to Embodiment 1 of the present invention.

FIG. 1 is a block diagram showing the constitution of a facility retrieval device according to Embodiment 1 of the present invention. It is assumed that this facility retrieval device is incorporated into an in-vehicle navigation apparatus for use.

The facility retrieval device according to Embodiment 1 comprises a GPS (Global Positioning System) receiver 1, a heading sensor 2, a vehicle speed sensor 3, an input device 4, a map information storage device 5, a storage device 6, a control device 7, and a display device 8.

The GPS receiver 1 receives a GPS signal transmitted from a GPS satellite and detects a current position of a host on the basis of the received GPS signal. The current position of the host detected by the GPS receiver 1 is transmitted to the control device 7 as a current position signal.

The heading sensor 2 detects variation in an advancement direction of the vehicle. Variation in the advancement direction of the vehicle detected by the heading sensor 2 is transmitted to the control device 7 as a heading signal. The vehicle speed sensor 3 detects rotation of a vehicle wheel and generates a vehicle speed pulse corresponding to the rotation of the vehicle wheel. The vehicle speed pulse generated by the vehicle speed sensor 3 is transmitted to the control device 7 as a vehicle speed signal.

The input device 4 is constituted by at least one of an operating panel, a touch panel, a voice input device, and so on, for example, and is used by a user to input various instructions into the facility retrieval device. A signal generated when the user operates the input device 4 is transmitted to the control device 7 as an operation signal.

The map information storage device 5 is constituted by an HDD (Hard Disk Drive), for example, that stores map information and facility information. The map information includes road data, road attribute data, and so on. The facility information includes facility names, facility types (type names or facility IDs), and so on. The map information and facility information stored in the map information storage device 5 are read by the control device 7. Note that the map information storage device 5 may be constituted by a DVD (Digital Versatile Disk) drive that reproduces information recorded on a DVD. In this case, the map information and facility information are stored on a DVD mounted on the DVD drive.

The storage device 6 is constituted by an HDD, for example, that temporarily stores data used in processing executed by the control device 7. The storage device 6 is accessed by the control device 7. The control device 7 is constituted by a microcomputer, for example, that controls the entire facility retrieval device. The control device 7 will be described in detail below.

The display device 8 is constituted by a liquid crystal display device, for example, that displays facility retrieval results as a list in accordance with display data transmitted from the control device 7. Note that in addition to the facility retrieval results, the display device 8 displays a map for realizing a navigation function, a host vehicle position mark, a route to a destination, and various other information.

Figure 2:
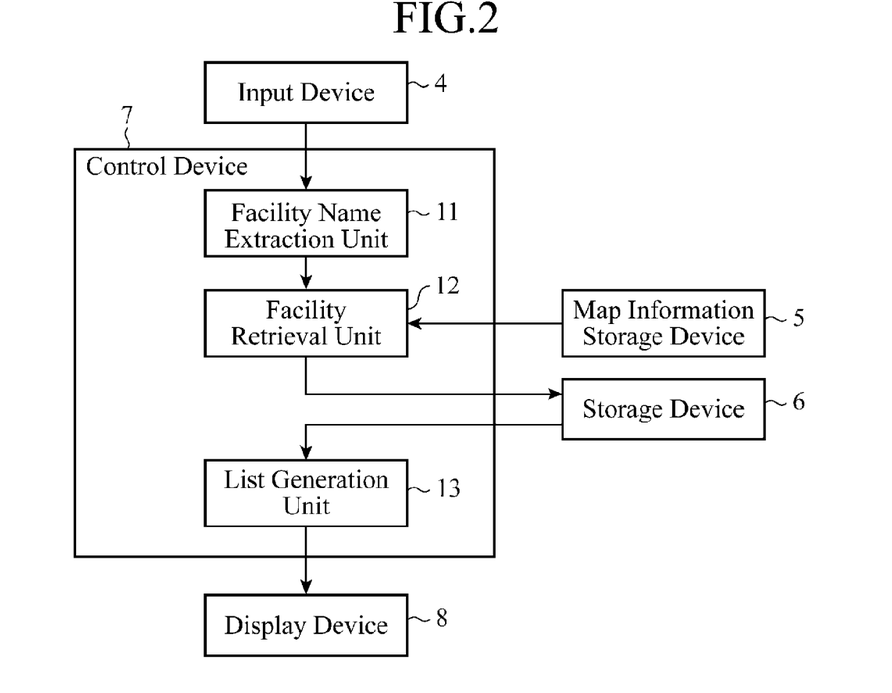
FIG. 2 is a block diagram showing the functional constitution of a control device used by the facility retrieval device according to Embodiment 1 of the present invention.

Next, the control device 7 mentioned above will be described in detail. FIG. 2 is a block diagram showing a functional constitution of the control device 7. The control device 7 includes a facility name extraction unit 11, a facility retrieval unit 12, and a list generation unit 13, all of which are realized by software processing performed on the microcomputer.

The facility name extraction unit 11 extracts a facility name (a character string) indicated by the operation signal transmitted from the input device 4. The facility name extracted by the facility name extraction unit 11 is transmitted to the facility retrieval unit 12.

The facility retrieval unit 12 uses the facility name transmitted from the facility name extraction unit 11 as a retrieval key to retrieve facilities having names that include the retrieval key from the facility information stored in the map information storage device 5. The facilities retrieved by the facility retrieval unit 12 are transmitted to the storage device 6 as retrieved facility information and stored therein temporarily.

The list generation unit 13 reads the retrieved facility information retrieved by the facility retrieval unit 12 and stored in the storage device 6, and generates a list listing the names of facilities having an identical name and an identical type to the facility name extracted by the facility name extraction unit 11, from among the facilities indicated by the read retrieved facility information, on respective single lines as shared facility names. The list generated by the list generation unit 13 is transmitted to the display device 8 as display data.

Figure 3:
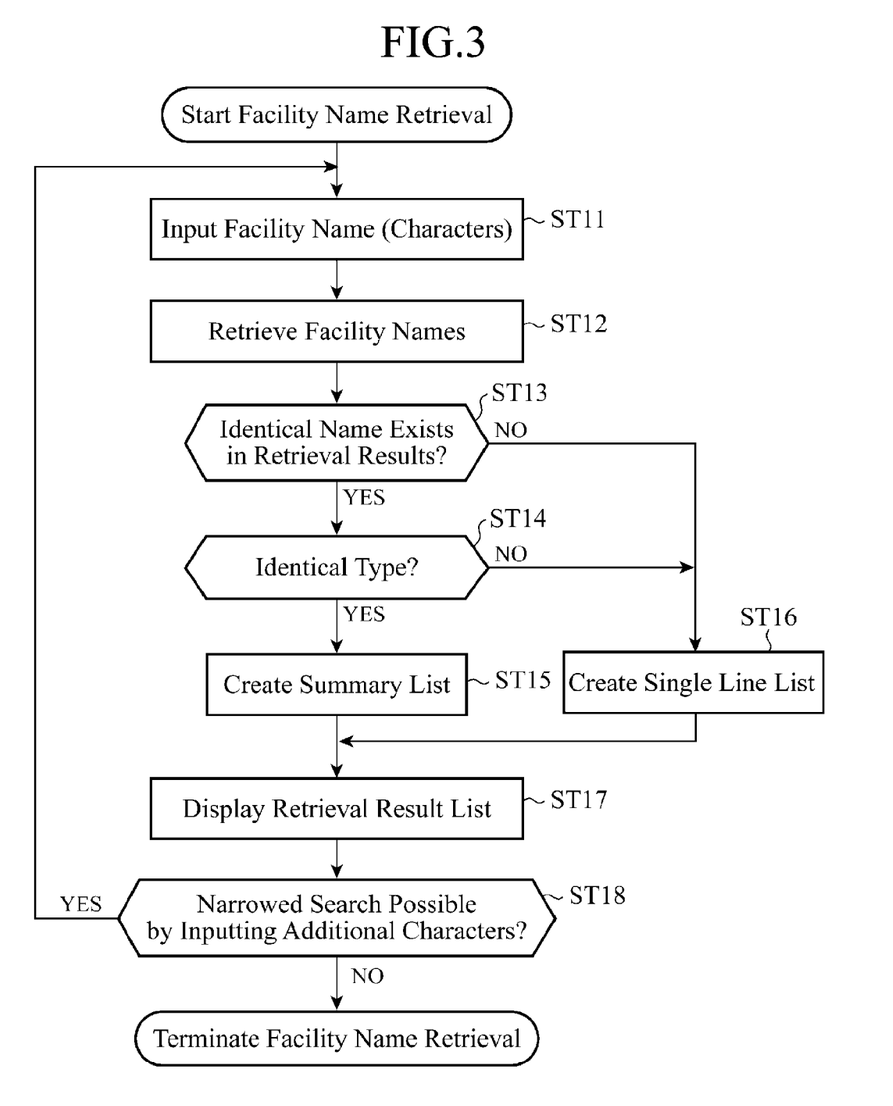
FIG. 3 is a flowchart showing an operation of the facility retrieval device according to Embodiment 1 of the present invention.

Next, an operation of the facility retrieval device according to Embodiment 1 of the present invention, constituted as described above, will be described with reference to a flowchart shown in FIG. 3, focusing on facility name retrieval processing.

Figure 4:
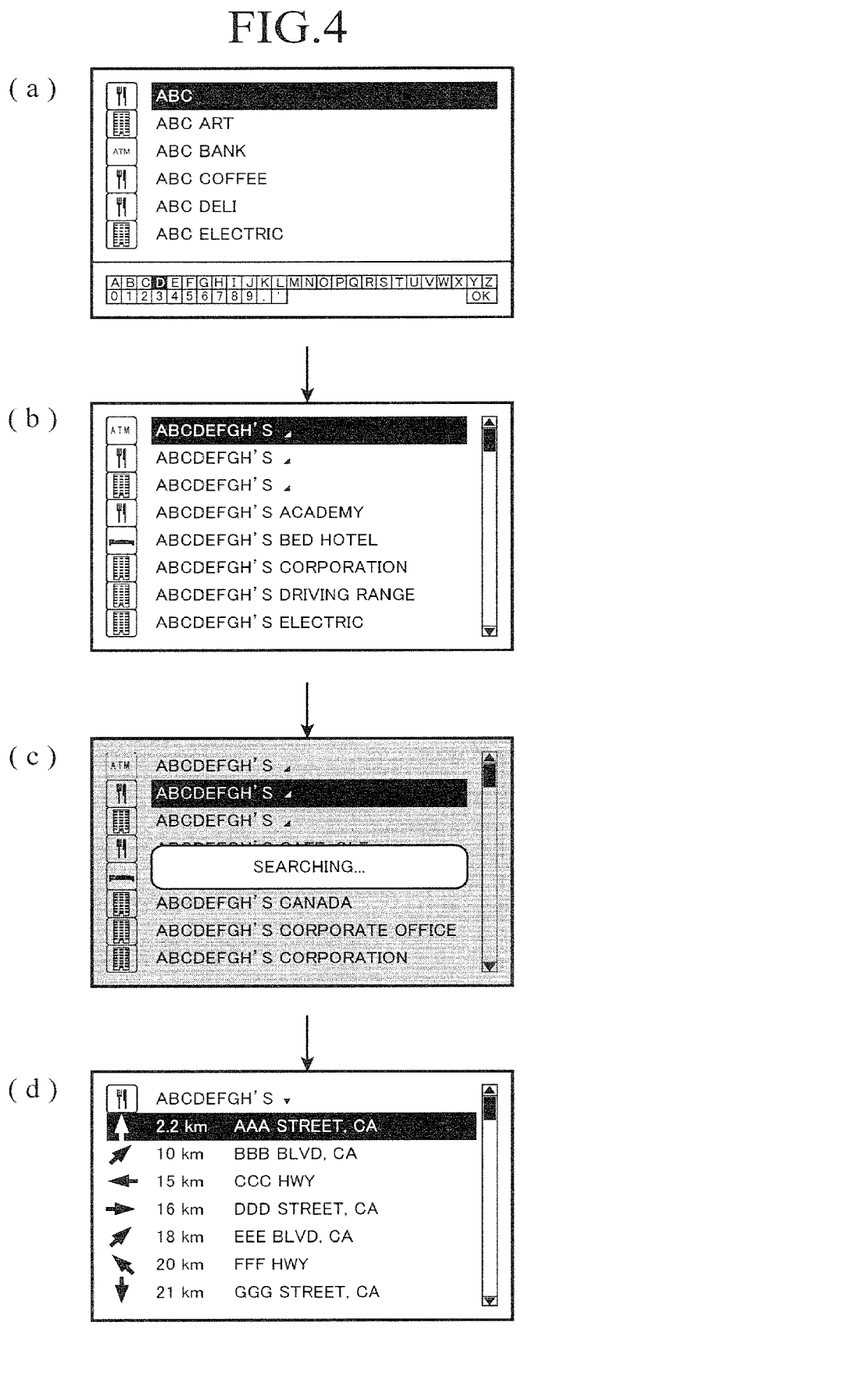
FIG. 4 is a view showing examples of display screens output by facility retrieval devices according to Embodiments 1 and 2 of the present invention.

In the facility name retrieval processing, first, the name of a facility serving as a facility retrieval subject is input (step ST11). More specifically, the user inputs a facility name (a character string) by operating the input device 4. FIG. 4(a) shows the manner in which a facility name is input by specifying characters displayed in a lower portion of a screen of the display device 8 sequentially using the input device 4. FIG. 4(a) shows a state in which "ABC", of a facility name "ABC-DEFGH", has been input. Input of the facility name is completed by pressing an "OK" button in the lower portion of the screen. A signal generated when the user operates the input device 4 is transmitted to the facility name extraction unit 11 as an operation signal. The facility name extraction unit 11 extracts the facility name (character string) indicated by the operation signal transmitted from the input device 4 and transmits the extracted facility name to the facility retrieval unit 12.

Next, a facility name retrieval operation is performed (step ST12). More specifically, the facility retrieval unit 12 uses the facility name transmitted from the facility name extraction unit 11 as a retrieval key to retrieve facilities having names that include the retrieval key from the facility information stored in the map information storage device 5, and transmits the retrieved facilities to the storage device 6 as retrieved facility information. As a result, information expressing the facilities obtained in the facility name retrieval operation is stored temporarily in the storage device 6.

Next, a determination is made as to whether or not an identical name exists among the retrieval results (step ST13). More specifically, the list generation unit 13 reads the retrieved facility information stored in the storage device 6 in the step ST12 to determine whether or not a facility having an identical name to the facility name extracted by the facility name extraction unit 11 exists among the facilities indicated by the read retrieved facility information.

When it is determined in the step ST13 that the retrieval results include an identical name, a determination is made as to whether or not the facility having the identical name is of an identical type (step ST14). More specifically, the list generation unit 13 determines whether or not the facility determined to have the identical name in the step ST13 is of the identical type as the facility extracted by the facility name extraction unit 11. When it is determined in the step ST14 that the facility is of the identical type, a summary list is generated (step ST15). More specifically, the list generation unit 13 generates a summary list listing the names of facilities having identical names and identical types on respective single lines as shared facility names, and transmits the generated list to the display device 8 as display data. The sequence then advances to a step ST17.

On the other hand, when it is determined in the step ST13 that the retrieval results do not include an identical name, and when it is determined in the step ST14 that the facility is not of the identical type, a single line list is created (step ST16). More specifically, the list generation unit 13 generates a single line list listing the names of the facilities retrieved in the step ST12 on single lines, and transmits the generated list to the display device 8 as display data. The sequence then advances to the step ST17.

In the step ST17, the retrieval result list is displayed. More specifically, the display device 8 displays the summary list and the single line list transmitted as display data from the list generation unit 13. As a result, a list of identically named facilities separated into facility types, for example, as shown in FIG. 4(b), is displayed. In FIG. 4(b), the facility name "ABCDEFGH" is displayed as a shared facility name on a single line for each of the facility types "ATM", "restaurant", and "company".

Next, a determination is made as to whether or not it is possible to perform a narrowed retrieval operation by inputting additional characters (step ST18). When it is determined in the step ST18 that a narrowed retrieval operation can be performed by inputting additional characters, the sequence returns to the step ST11, in which a facility name having additional characters is input. The processing described above is then repeated. When it is determined in the step ST18 that a narrowed retrieval operation cannot be performed by inputting additional characters, the facility name retrieval processing is terminated.

As described above, according to the facility retrieval device of Embodiment 1 of the present invention, a list that lists the name of a plurality of facilities having an identical name and an identical type to the facility extracted by the facility name extraction unit 11, from among the facilities retrieved by the facility retrieval unit 12, on a single line as a shared facility name is generated and displayed, and therefore large increases in the number of facilities displayed on the list can be suppressed. As a result, the readability of the list can be improved, which makes it easier for the user to find a desired facility.

Embodiment 2

A facility retrieval device according to Embodiment 2 of the present invention differs from the facility retrieval device according to Embodiment 1 in that a desired facility can be retrieved from a plurality of facilities listed on a single line of a list as a shared facility name.

The facility retrieval device according to Embodiment 2 is constituted identically to the facility retrieval device according to Embodiment 1 except that the control device 7 is modified to a control device 7a. The following description centers on parts that differ from the facility retrieval device according to Embodiment 1.

Figure 5:
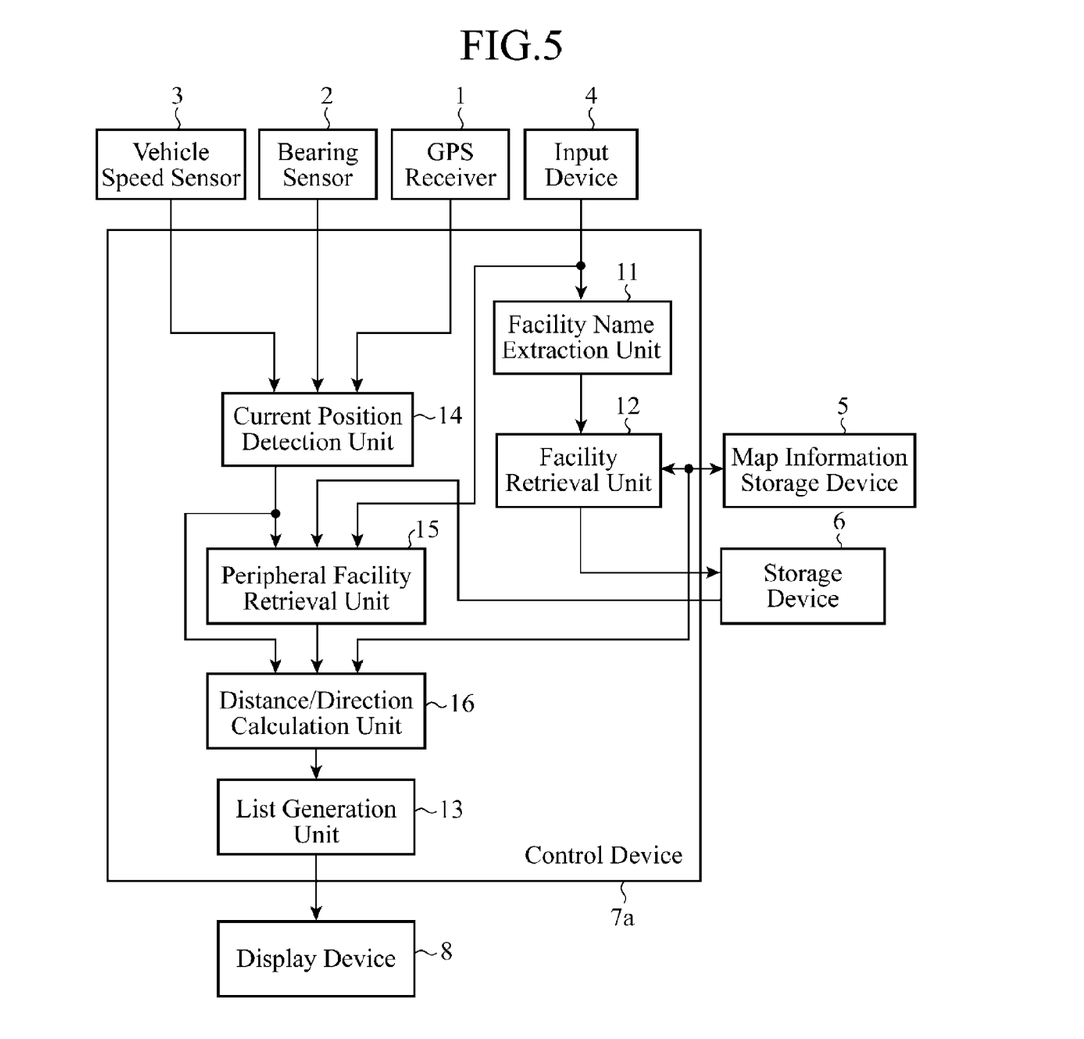
FIG. 5 is a block diagram showing the functional constitution of a control device used by the facility retrieval device according to Embodiment 2 of the present invention.

FIG. 5 is a block diagram showing the functional constitution of the control device 7a of the facility retrieval device according to Embodiment 2. The control device 7a includes, in addition to the constitution of the control device 7 of the facility retrieval device according to Embodiment 1, a current position detection unit 14, a peripheral facility retrieval unit 15, and a distance/direction calculation unit 16, all of which are realized by software processing performed on the microcomputer.

The current position detection unit 14 corresponds to a position calculation unit according to the present invention, and calculates a current position of the host vehicle on the basis of the current position signal transmitted from the GPS receiver 1, the heading signal transmitted from the heading sensor 2, and the vehicle speed signal transmitted from the vehicle speed sensor 3. The current position of the host vehicle determined by the current position detection unit 14 is transmitted to the peripheral facility retrieval unit 15 as reference position data indicating a reference position that will serve as the center of a peripheral facility retrieval operation to be described below.

Note that a position input from the input device 4 may be used as the reference position rather than the current position detected by the current position detection unit 14. In this case, the information indicated by the operation signal transmitted from the input device 4 is transmitted to the peripheral facility retrieval unit 15 as the reference position data.

When a shared facility name is selected from the list displayed on the display device 8 in response to an instruction input from the input device 4, the peripheral facility retrieval unit 15 retrieves facilities indicated by the shared facility name that exist on the periphery of the reference position detected by the current position detection unit 14 from the facilities indicated by the retrieved facility information read from the storage device 6. The facilities retrieved by the peripheral facility retrieval unit 15 are transmitted to the distance/direction calculation unit 16 as peripheral facility information.

The distance/direction calculation unit 16 calculates a distance to and a direction of the facilities indicated by the peripheral facility information transmitted from the peripheral facility retrieval unit 15, or in other words a distance and a direction from the reference position detected by the current position detection unit 14, on the basis of the map information read from the map information storage device 5. The distances and directions calculated by the distance/direction calculation unit 16 are then transmitted to the list generation unit 13.

Figure 6:
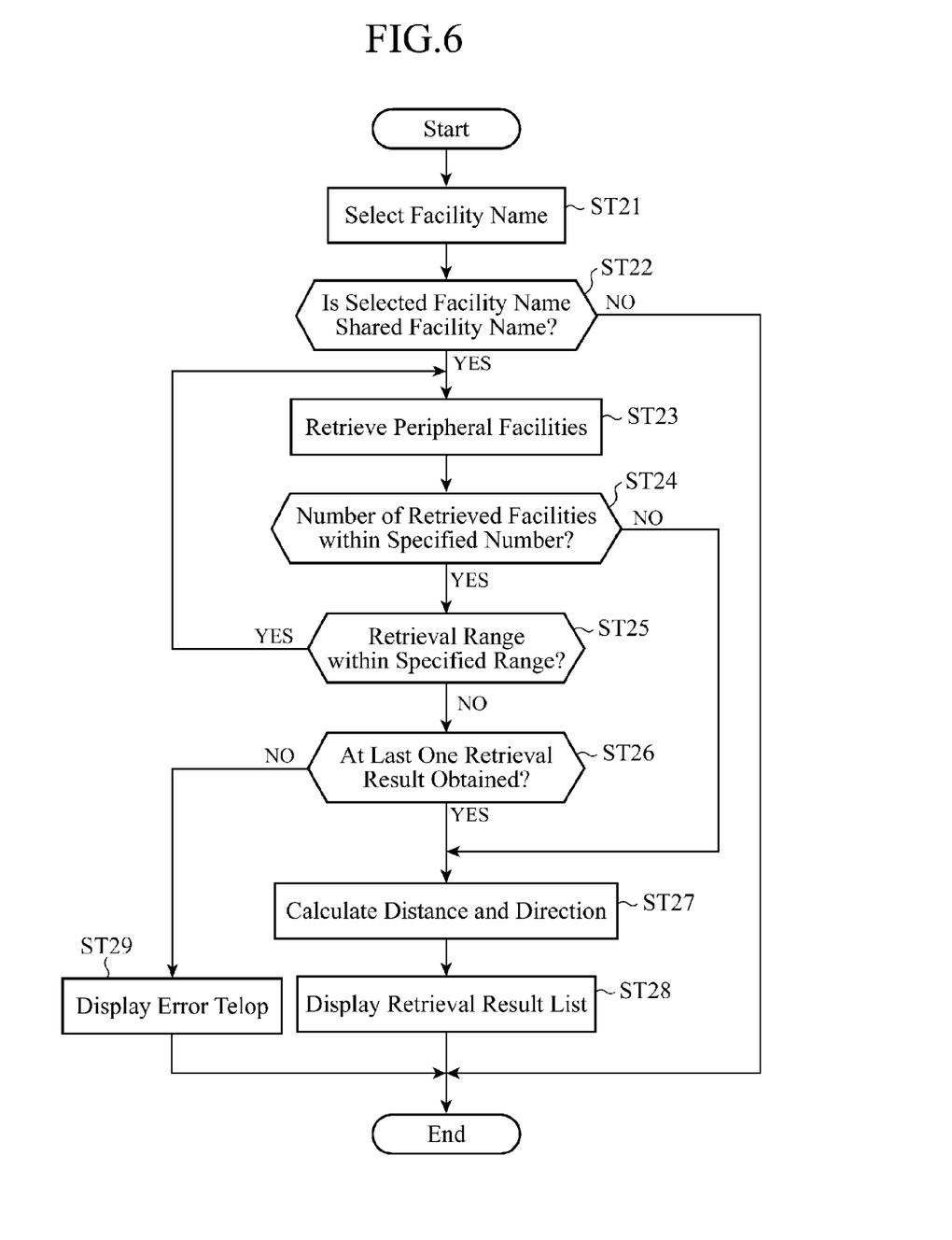
FIG. 6 is a flowchart showing an operation of the facility retrieval device according to Embodiment 2 of the present invention.

Next, an operation of the facility retrieval device according to Embodiment 2 of the present invention, constituted as described above, will be described with reference to a flowchart shown in FIG. 6, focusing on peripheral facility retrieval processing. The peripheral facility retrieval processing is executed after the retrieval result list is displayed in the step ST17 performed by the facility retrieval device according to Embodiment 1 and shown in the flowchart of FIG. 3.

In the peripheral facility retrieval processing, first, one facility name is selected (step ST21). More specifically, the user operates the input device 4 to select the name of a single facility from a list such as that shown in FIG. 4(b), which is displayed on the display device 8. A signal generated when the user operates the input device 4 is transmitted to the peripheral facility retrieval unit 15 as an operation signal.

Next, a determination is made as to whether or not the selected facility name is a shared facility name (step ST22). More specifically, the peripheral facility retrieval unit 15 determines whether or not the facility name selected in the step ST21, or in other words the name of the facility indicated by the operation signal transmitted from the input device 4, is a shared facility name expressing the name of a plurality of facilities having identical names and types. When it is determined in the step ST22 that the selected facility name is not a shared facility name, the peripheral facility retrieval processing is terminated.

When it is determined in the step ST22 that the selected facility name is a shared facility name, on the other hand, a peripheral facility retrieval operation is performed (step ST23). More specifically, the peripheral facility retrieval unit 15 retrieves facilities having the name indicated by the operation signal transmitted from the input device 4 and existing within a pre-specified range of the reference position detected by the current position detection unit 14, or in other words facilities existing on the periphery of the host vehicle, from the facilities indicated by the retrieved facility information read from the storage device 6. During the facility retrieval operation, the display device 8 displays a screen indicating that facility retrieval is underway. FIG. 4(c) shows an example of a screen displayed when a peripheral facility retrieval operation is underway in a state where a restaurant "ABC-DEFGH'S" has been selected as the facility name.

Next, a determination is made as to whether or not a number of retrieved facilities is within a specified number (step ST24). More specifically, the peripheral facility retrieval unit 15 determines whether or not the number of facilities retrieved in the step ST23 is within a pre-specified number. When it is determined in the step ST24 that the number of retrieved facilities is not within the specified number, or in other words is larger than the specified number, the peripheral facility retrieval unit 15 terminates the peripheral facility retrieval operation and transmits the retrieved facilities to the distance/direction calculation unit 16. The sequence then advances to a step ST27.

When it is determined in the step ST24 that the number of retrieved facilities is within the specified number, on the other hand, a determination is made as to whether or not a retrieval range is within a specified range (step ST25). More specifically, the peripheral facility retrieval unit 15 determines whether or not a retrieval range defined by the distance from the reference position is within a pre-specified range. When it is determined in the step ST25 that the retrieval range is within the specified range, the retrieval range is widened by increasing the distance from the reference position by a pre-determined value, whereupon the sequence returns to the step ST23 and the peripheral facility retrieval operation is performed again. When it is determined in the step ST25 that the retrieval range is not within the specified range, on the other hand, a determination is made as to whether or not at least one retrieval result has been obtained (step ST26). More specifically, the peripheral facility retrieval unit 15 determines whether or not the number of facilities retrieved in the step ST23 is at least one. When it is determined in the step ST26 that at least one retrieval result has been obtained, the peripheral facility retrieval unit 15 transmits the retrieved facilities to the distance/direction calculation unit 16. The sequence then advances to the step ST27.

In the step ST27, the distance and direction are calculated. More specifically, the distance/direction calculation unit 16 calculates, in relation to all of the facilities transmitted from the peripheral facility retrieval unit 15, the distance to the facility and the direction of the facility on the basis of the map information read from the map information storage device 5. The distances and directions calculated by the distance/direction calculation unit 16 are added to the facility names and transmitted to the list generation unit 13.

Next, the retrieval result list is displayed (step ST28). More specifically, the list generation unit 13 generates a list of facility names including the distances and directions transmitted from the distance/direction calculation unit 16, and transmits the generated list to the display device 8 as display data. The display device 8 then displays the list of facility names including the distances and directions transmitted from the list generation unit 13 as the display data.

As a result, a list of identically named facilities of each facility type existing within a predetermined range from the reference position is displayed together with the distance to and the direction of each facility. As shown in FIG. 4(d), for example, a list of facilities having the name "ABCDEFGH" and the type "restaurant" is displayed together with the distances to and the directions of the respective restaurants. The peripheral facility retrieval processing is then terminated.

When it is determined in the step ST26 that not even one retrieval result has been obtained, an error telop is displayed (step ST29). More specifically, the peripheral facility retrieval unit 15 generates an error telop indicating that not even one retrieval result has been obtained, and transmits the generated error telop to the display device 8 as display data. As a result, a telop indicating that not even one retrieval result has been obtained is displayed on the display device 8.

Note that instead of displaying the error telop or at the same time as the error telop is displayed in the step ST29, the sequence may be returned to the step ST23 after widening the retrieval range. With this constitution, the user can check whether or not the desired facility exists within a wider range.

As described above, according to the facility retrieval device of Embodiment 2 of the present invention, when a single shared facility name is selected, facilities on the periphery of the selected facility are retrieved automatically; thus, the user does not have to perform an operation to input additional information in order to reduce the number of displayed items, for example an operation to input the name of a country, the name of a city, and so on. Moreover, the user can perform a retrieval operation without knowing the location of a target facility.

Further, since a distance and a direction from the reference position serving as the center of the peripheral facility retrieval operation are displayed on the peripheral facility retrieval result list, the user can select the target facility easily. Furthermore, since a limit is applied to the peripheral facility retrieval range, the time required for the retrieval operation can be shortened and an amount of memory consumed in the retrieval operation can be suppressed.

INDUSTRIAL APPLICABILITY

In the facility retrieval device of the present invention, large increases in a number of facilities displayed on a list can be suppressed, which can enhance an improvement in the readability of the list; thus, a user can find a desired facility easily. Therefore, it is suitable for use as a facility retrieval device or the like that displays retrieval results when a large number of facilities are retrieved.

The invention claimed is:

1. A facility retrieval device comprising:
an input device that inputs an instruction;
a map information storage device that stores map information and facility information including a facility name and a business type of a facility;
a facility name extraction unit that extracts a facility name in response to an instruction from the input device;
a facility retrieval unit that uses the facility name extracted by the facility name extraction unit as a retrieval key and retrieves facilities from the facility information stored in the map information storage device based on the retrieval key;
a first list generation unit that generates a first list in which facilities having different facility names are listed, by listing together a plurality of facilities which have an identical facility name and an identical business type, on a single line in which a shared facility name and a picture showing the identical business type of the plurality of facilities are arranged, and also listing another facility which does not have the identical facility name and the identical business type, on a single line in which a facility name and a picture showing a business type of the facility are arranged, from among the facilities retrieved by the facility retrieval unit;
a display device that, when displays the first list, displays the picture showing the identical business type, the shared facility name and a scroll function, on a screen in order from left to right;
a position calculation unit that calculates a reference position of a retrieval operation; and
a second list generation unit that, if the shared facility name is selected from the first list displayed on the display device in response to an instruction input from the input device, generates a second list in which the plurality of facilities which have the identical facility name shown by the selected shared facility name and the identical business type are listed in ascending order of distance from the reference position calculated by the position calculation unit,
wherein the display device displays the second list.

2. The facility retrieval device according to claim 1, further comprising a distance/direction calculation unit that calculates distance and direction of retrieved facilities from the reference position calculated by the position detection unit on the basis of the map information stored in the map information storage device,
wherein the second list generation unit generates a list listing facility names of the retrieved facilities together with the distance and the direction calculated by the distance/direction calculation unit.

3. The facility retrieval device according to claim 1, wherein the second list generation unit generates a list of facilities which are retrieved within a predetermined limited range.

4. A facility retrieval method comprising:
inputting, by utilizing an input device, an instruction;
storing map information and facility information including a facility name and a business type of a facility onto a map information storage device;
extracting, by utilizing a facility name extraction unit, a facility name in response to an instruction from the input device;
a facility retrieval step that uses the facility name extracted by the facility name extraction unit as a retrieval key and retrieves facilities from the facility information stored in the map information storage device based on the retrieval key;
a first list generation step that generates a first list in which facilities having different facility names are listed, by listing together a plurality of facilities which have an identical facility name and an identical business type, on a single line in which a shared facility name and a picture showing the identical business type of the plurality of facilities are arranged, and also listing another facility which does not have the identical facility name and the identical business type, on a single line in which a facility name and a picture showing a business type of the facility are arranged, from among the facilities retrieved by the facility retrieval step;
displaying on a display device, when displaying the first list, the picture showing the identical business type, the shared facility name and a scroll function, on a screen in order from left to right;
calculating a reference position of a retrieval operation;
a second list generation step that, if the shared facility name is selected from the first list displayed on the display device in response to an instruction input from the input device, generates a second list in which the plurality of facilities which have the identical facility name shown by the selected shared facility name and the identical business type are listed in ascending order of distance from the calculated reference position; and
displaying the second list on the display device.

5. The facility retrieval method according to claim 4, further comprising calculating distance and direction of retrieved facilities from the calculated reference position on the basis of the map information stored in the map information storage device,
wherein the second list generation step generates a list listing facility names of the retrieved facilities together with the calculated distance and the direction.

6. The facility retrieval method according to claim 4, wherein the second list generation step generates a list of facilities which are retrieved within a predetermined limited range.

* * * * *